(12) United States Patent
Ross (10) Patent No.: US 8,271,244 B2
(45) Date of Patent: Sep. 18, 2012

(54) HYBRID STRATIGRAPHIC LAYERING USING PSEUDO-WHEELER SPACE

(75) Inventor: William C. Ross, Littleton, CO (US)

(73) Assignee: Landmark Graphics Corporation, Houston, TX (US)

( * ) Notice: Subject to any disclaimer, the term of this patent is extended or adjusted under 35 U.S.C. 154(b) by 0 days.

(21) Appl. No.: 12/812,707

(22) PCT Filed: Jan. 28, 2008

(86) PCT No.: PCT/US2008/052190
§ 371 (c)(1),
(2), (4) Date: Jul. 13, 2010

(87) PCT Pub. No.: WO2009/096942
PCT Pub. Date: Aug. 6, 2009

(65) Prior Publication Data
US 2010/0292972 A1  Nov. 18, 2010

(51) Int. Cl.
*G06G 7/48* (2006.01)
(52) U.S. Cl. .......................................................... 703/6
(58) Field of Classification Search ........................ 703/6
See application file for complete search history.

(56) References Cited

U.S. PATENT DOCUMENTS

| | | | |
|---|---|---|---|
| 4,991,095 A * | 2/1991 | Swanson | 702/16 |
| 5,475,589 A | 12/1995 | Armitage | |
| 5,586,082 A | 12/1996 | Anderson et al. | |
| 5,999,485 A | 12/1999 | Anstey et al. | |
| 6,393,366 B1 | 5/2002 | Saggaf | |
| 6,721,661 B2 | 4/2004 | Anstey et al. | |
| 6,823,266 B2 | 11/2004 | Czernuszenko et al. | |
| 7,042,801 B1 | 5/2006 | Berg | |
| 7,079,953 B2 | 7/2006 | Thorne et al. | |
| 7,523,024 B2 * | 4/2009 | Endres et al. | 703/6 |
| 2003/0025692 A1 | 2/2003 | Lu et al. | |
| 2006/0074825 A1 | 4/2006 | Mirowski | |
| 2006/0136162 A1 * | 6/2006 | Hamman et al. | 702/104 |
| 2006/0197759 A1 * | 9/2006 | Fremming | 345/420 |
| 2008/0015784 A1 * | 1/2008 | Dorn et al. | 702/16 |
| 2009/0204377 A1 * | 8/2009 | Van Wagoner et al. | 703/9 |

OTHER PUBLICATIONS

Maulin D. Patel et al., "Building 2-D stratigraphic and structure models from well log data and control horizon", 2003, Computers & Geosciences, vol. 29, pp. 557-567.*

Jean-Laurent Mallet, "Space-time mathematical framework for sedimentary geology", Jan. 2004, Mathematical Geology, vol. 36, No. 1, pp. 1-32.*

(Continued)

*Primary Examiner* — Kandasamy Thangavelu
*Assistant Examiner* — Russ Guill
(74) *Attorney, Agent, or Firm* — Howard L. Speight; Bradley A. Misley (57) ABSTRACT

A sequence in the earth, defined by an upper sequence boundary and a lower sequence boundary, where at least one of the boundaries includes an unconformity, is modeled by creating a restored space corresponding to the sequence by reconstructing a portion of the sequence missing because of the unconformity. The sequence in restored space has a restored top boundary having a position and a restored base boundary having a position. Stratigraphic layering is performed within the restored space sequence, using as guides the positions of the restored top boundary and the restored base boundary of the sequence in restored space.

14 Claims, 6 Drawing Sheets

OTHER PUBLICATIONS

William Helland-Hansen et al., "A simulation of continental basin margin sedimentation in response to crustal movements, eustatic sea level change, and sediment accumulation rates", 1988, Mathematical Geology, vol. 20, No. 7, pp. 777-802.*

Cyril Galera et al., "Construction of coherent 3D geological blocks", 2003, Computers & Geosciences, vol. 29, pp. 971-984.*

Jean-Laurent Mallet, "Geomodeling", 2002, Oxford University Press, pp. 422-424.*

Paul de Groot et al., "How to create and use 3D Wheeler transformed seismic volumes", 2006, SEG/New Orleans 2006 Annual Meeting, pp. 1038-1042.*

Wheeler, Harry E., "Baseleve, Lithosphere Surface, and Time-Stratigraphy", *Geological Society of America Bulletin.* v. 75, Jul. 1964, 599-610.

"Theoretical Stratigraphy, Part I: Wheeler's Baseline", *Or Something Blog*, (Jul. 29, 2007).

"Chapter 3. Sequence Stratigraphic Interpretation System", *OpendTect dGB Plugins User Documentation V3 0*, printed Jul. 28, 2010.

Massonnat, Gerard J., "Breaking of a Paradigm: Geology Can Provide 3D Complex Probabillity Fields for Stochastic Facies Modelling", *Society of Petroleum Engineers 56652*, (1999), 1-14.

Embry, Ashton et al., "Sequence Stratigraphy as a "Concrete" Stratigraphic Discipline", *Report of the ISSC Task Group on Sequence Stratigraphy*, (Feb. 2007).

Kedzierski, P. et al., "Stochastic Simulation of Marine Reservoirs Through Paleotopography Modeling", *Society of Petroleum Engineers 102996*, (2006),1-7.

Ross, William C., "Patent Application entitled "Adding Positionl Information for Surfaces in a Geological Formation After Transforming to a Gapped Representation"", U.S. Appl. No. 12/186,225, 2008.

"Filing Receipt for U.S. Appl. No. 12/186,225", U.S. Appl. No. 12/186,225, 2008.

"PCT/US08/52190 ISR and Written Opinion", PCT/US08/52190, (Jul. 14, 2008).

Letter from the Examiner of Canadian Application No. 2,713,390, which is the Canadian application that corresponds to the instant appliction, Canadian Intellectual Property Office, Feb. 28, 2012.

First Office Action in Chinese Patent Application No. 200880126023.X, which is the Chinese version of the instant application, Nov. 24, 2011.

Translation of First Office Action in Chinese Patent Application No. 200880126023.X, which is the Chinese version of the instant application, Nov. 24, 2011.

Instituto Mexicano de la Propiedad Industrial, Office Action in application No. MX/a/2010/008182, which is the corresponding Mexican version of the instant application, issued on May 29, 2012.

Translation of May 29, 2012 Office Action from Mexican Institute of Industrial Property in File No. MX/a/2010/008182, which is the corresponding Mexican version of the instant application.

* cited by examiner

Fig. 1 Top Down Stratigraphic Layering (Prior Art)

Fig. 2 Bottom Up Stratigraphic Layering (Prior Art)

Fig. 3 Proportional Stratigraphic Layering (Prior Art)

HYBRID STRATIGRAPHIC LAYERING USING PSEUDO-WHEELER SPACE

BACKGROUND

Stratigraphic layering is a process used in the modeling of the earth for geoscience purposes whereby an earth model is enhanced by introducing layers between correlated sequence boundaries to increase the resolution of the model. A depositional sequence is a stratigraphic unit composed of genetically related strata that is bounded at its top and base by unconformities or their correlative surfaces.

Figure 1:
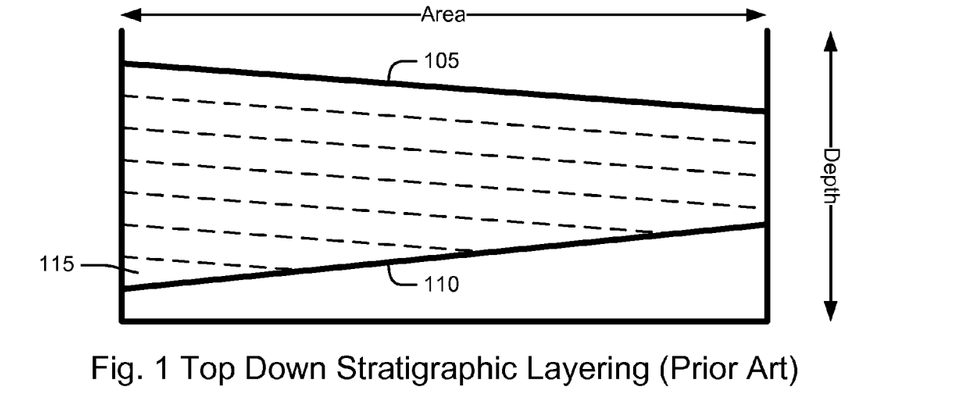
FIGS. 1-3 illustrate prior art methods for stratigraphic layering.
Figure 2:
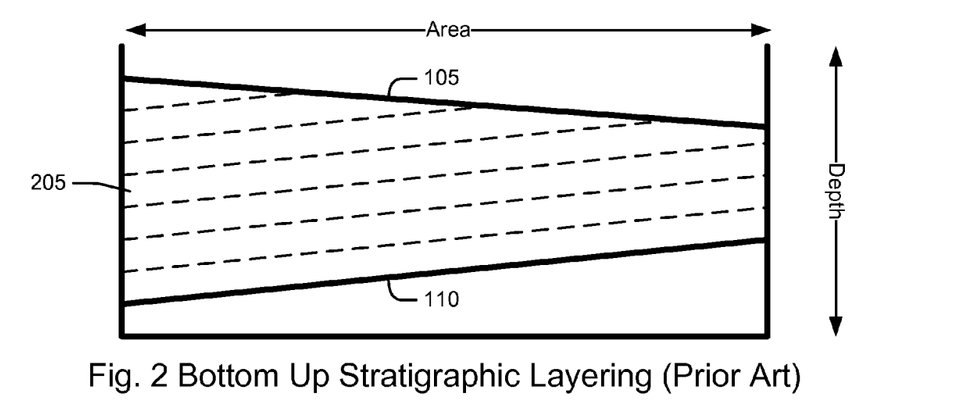
Figure 3:
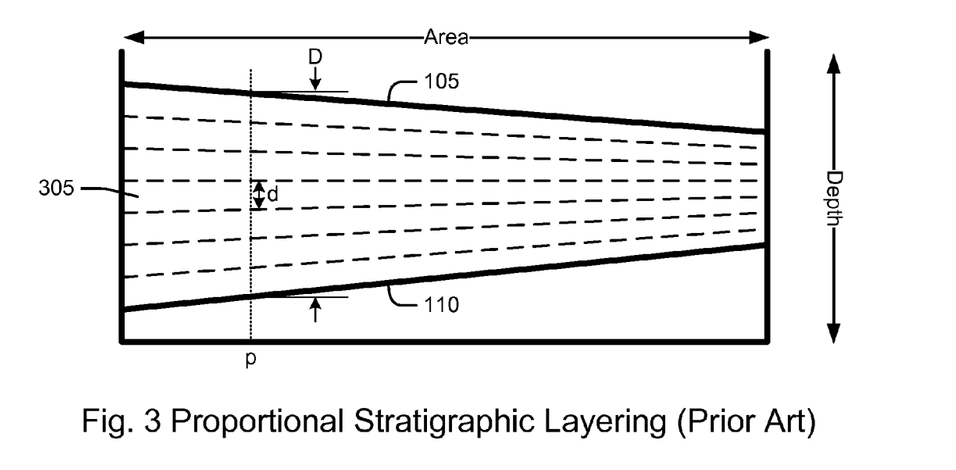

An earth model with stratigraphic layering can be used for high-resolution facies and/or property modeling. One goal of stratigraphic layering is to create a high-resolution subdivision of a sequence which properly reflects the internal layering of the sequence. Examples of existing approaches to stratigraphic layering are shown in FIGS. 1-3, which show an area-depth representation of a sequence bounded by an upper sequence boundary 105 and a lower sequence boundary 110. In top down stratigraphic layering, illustrated in FIG. 1, the introduced layers, e.g. 115, are parallel to the top sequence boundary 105. In bottom up stratigraphic layering, illustrated in FIG. 2, the introduced layers, e.g. 205, are parallel to the bottom sequence boundary 110. In proportional stratigraphic layering, illustrated in FIG. 3, each of the introduced layers, e.g. 305, varies in width. The width d of each introduced layer at any given point p is proportional to the distance D between the sequence boundaries at that point.

Harry E. Wheeler, in an article entitled *Baselevel, Lithosphere Surface, and Time-Stratigraphy*, GEOLOGICAL SOCIETY OF AMERICA BULLETIN, v. 75, pp. 599-610 (July 1964) (hereinafter "Wheeler Article"), described a way to show sequences in area-time rather than the traditional area-depth view. In the area-time view, which will be referred to as Wheeler Space, "the vertical dimension is time [rather than depth] and . . . all lithosphere surface-moments expressing the succession of events are horizontal and parallel." Wheeler Article at 606.

DETAILED DESCRIPTION

Figure 4:
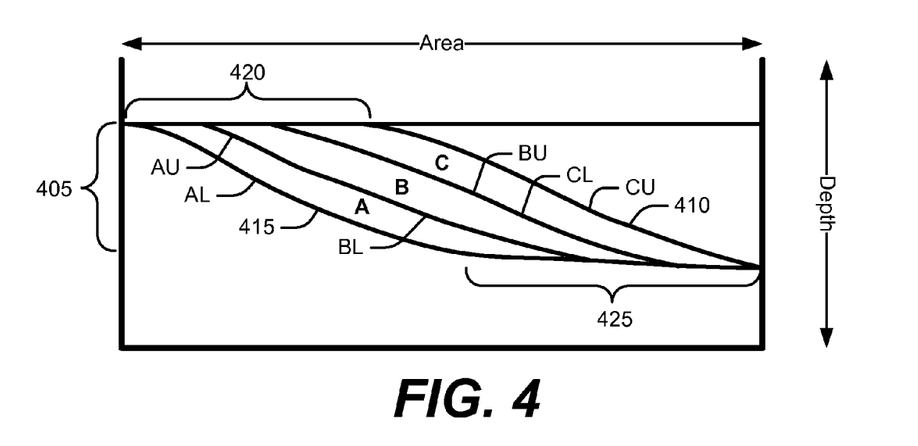
FIG. 4 illustrates a sequence bounded by unconformities.

An example of a representation of sequence 405 in an earth model is illustrated in FIG. 4. The sequence 405 is bounded on one side by an upper sequence boundary 410 and on the other side by a bottom sequence boundary 415.

The sequence 405 includes three sub-sequences A, B, and C, each of which is bounded by complex curved boundaries. Sub-sequence A is bounded by lower boundary AL and upper boundary AU. Sub-sequence B is bounded by lower boundary BL (which is the same as upper boundary AU) and upper boundary BU. Sub-sequence C is bounded by lower boundary CL (which is the same as upper boundary BU) and upper boundary CU.

Figure 5:
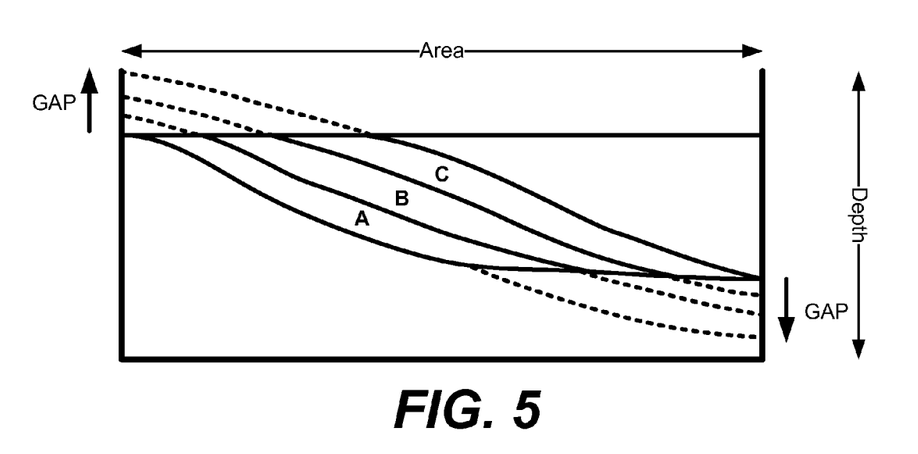
FIG. 5 illustrates the gaps (restored position of time lines) in the geological record of FIG. 4.

Both the upper sequence boundary 410 and the bottom sequence boundary 415 include unconformities, 420 and 425, respectively. An unconformity is a surface of erosion or non-deposition that separates younger strata from older rocks and represents a significant hiatus. The three sub-sequences A, B, and C terminate at the unconformity 420 on the upper sequence boundary 410 and the unconformity 425 on the bottom sequence boundary 415 indicating gaps in the geological record on either side of the sequence, as illustrated in FIG. 5. The gaps represent gaps in the geological record within which deposition may have occurred and then eroded away or where deposition never occurred.

The existing approaches to stratigraphic layering could use top down or bottom up stratigraphic layering for portions of the sequence 405 in which the top unconformity 420 and the bottom unconformity 425 are parallel to each other, and proportional layering for other portions of the sequence 405.

Figure 6:
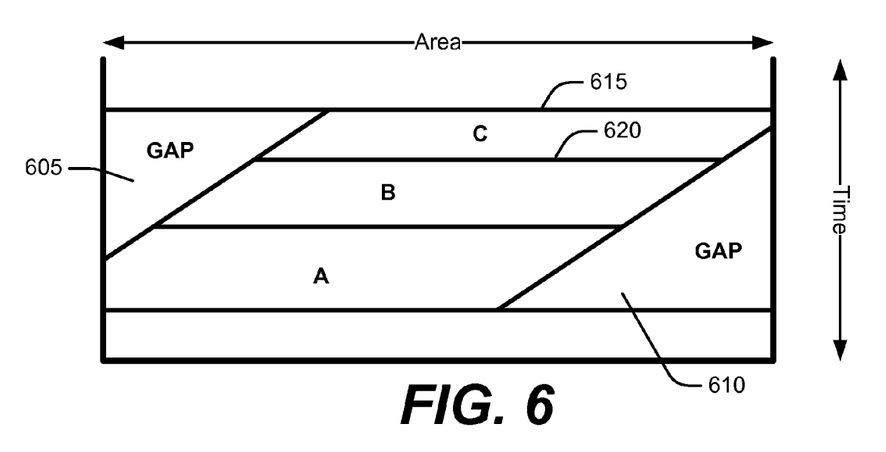
FIG. 6 illustrates the sequence shown in FIG. 4 in Wheeler space.

In one embodiment of a restored-space approach to stratigraphic layering the sequence is transformed from the area-depth space shown in FIG. 4 to a restored space view. For example, FIG. 6 shows the sequence 405 from FIG. 4 transformed into Wheeler space, which is an example of restored space. The boundaries of intervals A, B, and C, which were complexly curved in FIG. 4, appear as horizontal lines in FIG. 6. The gaps 605 and 610 in the geological record in FIG. 4 appear on either side of the sequence. In one embodiment, the transform into Wheeler space can be performed with an off-the-shelf tool, such as the OpendTect software available from dGB.

Figure 7:
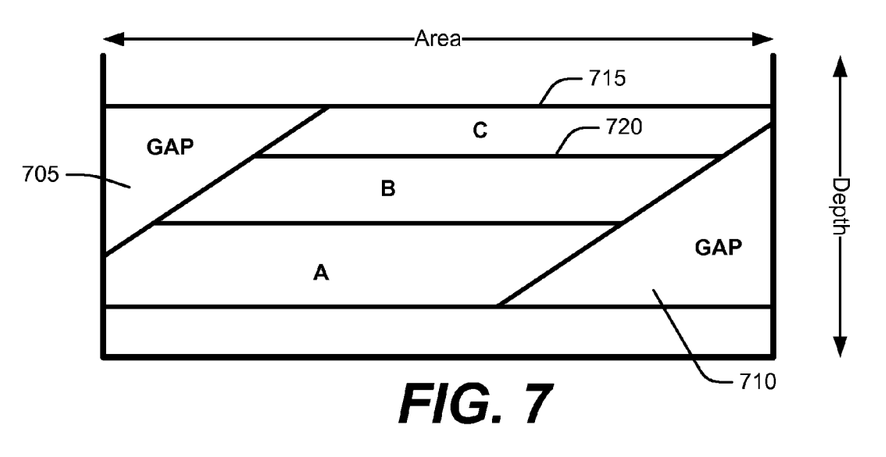
FIG. 7 illustrates the sequence shown in FIG. 5 in Pseudo-Wheeler space.

Similarly, FIG. 7 shows the sequence after it has been transformed into Pseudo-Wheeler space, which is an example of restored space. Pseudo-Wheeler space has the appearance of Wheeler space but the vertical axis is depth rather than time. In Pseudo-Wheeler space the unconformities are split to create gaps where sediments are no longer present, such as gaps 705 and 710 shown in FIG. 7, without translating into the area-time domain Pseudo-Wheeler space, like Wheeler space, is an example of a restored space in which the gaps (or missing section) in the geological record are restored, and as the result of this restoration (gapping), the top and base boundaries of the sequence (e.g., top boundary 715 and bottom boundary 720 of restored sub-sequence C, respectively) are approximately parallel and horizontal. In Wheeler space, the top and base boundaries of the sequence (e.g., top boundary 615 and bottom boundary 620 of restored sub-sequence C, respectively) are perfectly parallel and horizontal. In one embodiment, the transform into Pseudo-Wheeler space can be performed using the smartSection® tool available from the Landmark Graphics Division of Halliburton Corporation.

Figure 8:
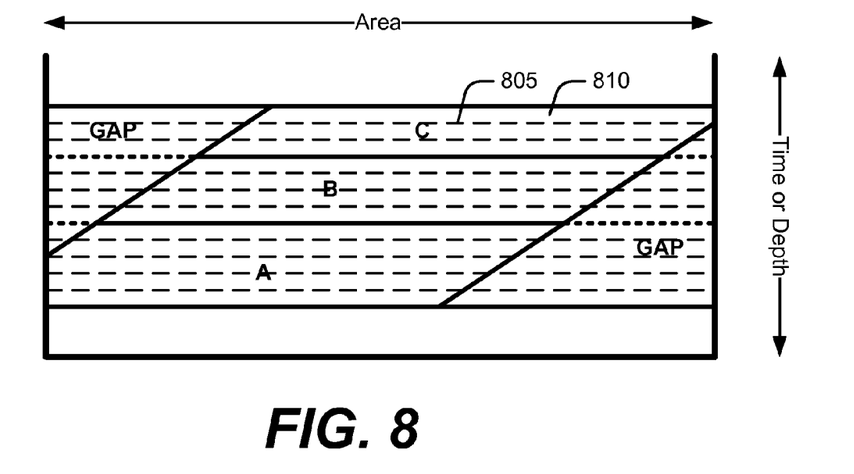
FIG. 8 shows the sequence in FIG. 5 (or FIG. 6) after stratigraphic layering has been performed.

In one embodiment, stratigraphic layering is performed on the restored space version of the sequence, as shown in FIG. 8, in which the dashed lines represent newly added boundaries, e.g. 805, between new sub-sub-sequences, e.g. 810. The stratigraphic layering of each restored sub-sequence is performed using as guides the location of its restored top boundary and its restored bottom boundary. Since the sub-sequence boundaries are approximately parallel in Pseudo-Wheeler space, the new stratigraphic layering boundaries can be introduced using proportional layering. Top-down layering and bottom-up layering can also be used in many Pseudo-Wheeler space models. The existing stratigraphic layering techniques can also be used in stratigraphic layering using a Wheeler space model. In one embodiment, the new boundaries extend into the gaps 605, 610 or 705, 710, further simplifying the application of existing stratigraphic layering techniques. In one embodiment, the new boundaries do not extend into the gaps 605, 610 or 705, 710.

In one embodiment, the deposition of sediments over time is modeled in the restored space. For example, the technique of mass balancing may be applied. Mass (or area) balancing across a depositional sequence involves keeping track of sediment volumes (or areas) deposited in different positions within the basin over time. For example, mass balance analysis might attempt to track the proportion of total sediment deposited in shallow versus deep-water environments over time. By utilizing restored-space or pseudo-Wheeler space views, all sediments deposited and then eroded over time can be properly included in the mass balance calculations.

In one embodiment, facies boundaries are identified within each stratigraphic layer in the restored space. For example, analysis of well logs may allow properties, such as porosity or resistivity, to be assigned to sub-sub-sequences, or portions of sub-sub-sequences. An analysis of the properties assigned to the various sequences in the model may allow facies boundaries, such as the boundary between marine and non-marine rocks, to be identified.

Figure 9:
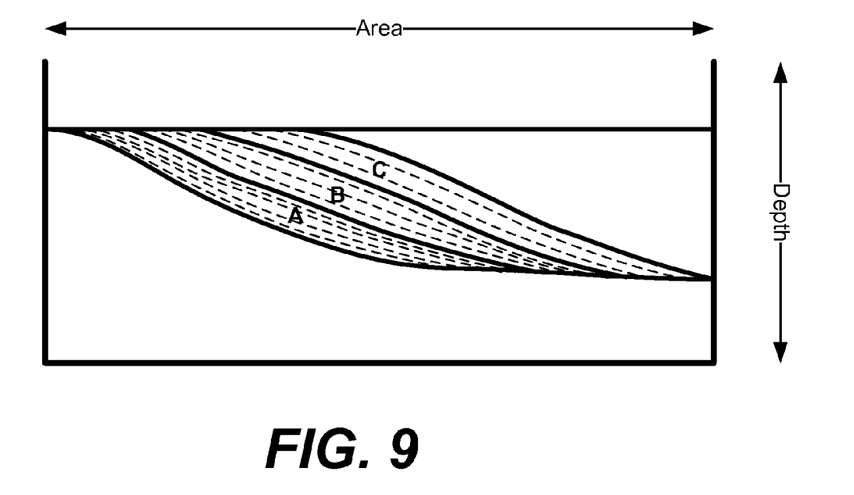
FIG. 9 shows the sequence shown in FIG. 8 transformed to area-depth space.

In one embodiment, the representation of the sequence in restored space, such as that shown in FIG. 8, is transformed back into a traditional area-depth space, such as that shown in FIG. 9. Note that in FIG. 9 the new boundaries represented by dashed lines conform to the sequence boundaries, shown by solid lines.

Figure 10:
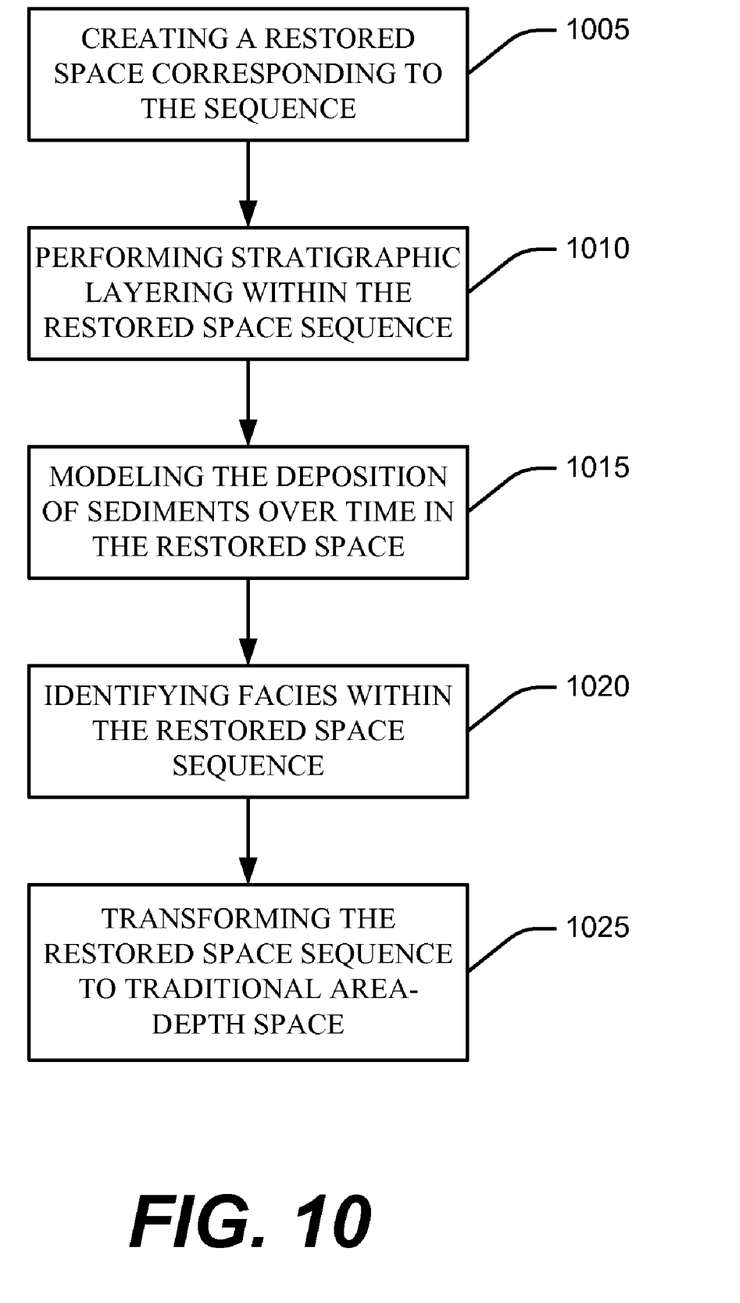
FIG. 10 shows a flow chart for an example restored space stratigraphic layering system.

In practice, as shown in FIG. 10, a restored space stratigraphic layering system operates on a sequence in traditional area-depth space by creating a restored space corresponding to the sequence (block 1005). The system then performs stratigraphic layering within the restored space sequence (block 1010). The system then models the deposition of sediments over time in the restored space (block 1015). The system then identifies facies within the restored space sequence (block 1020). The system then transforms the restored space sequence to traditional area-depth space (block 1025).

Figure 11:
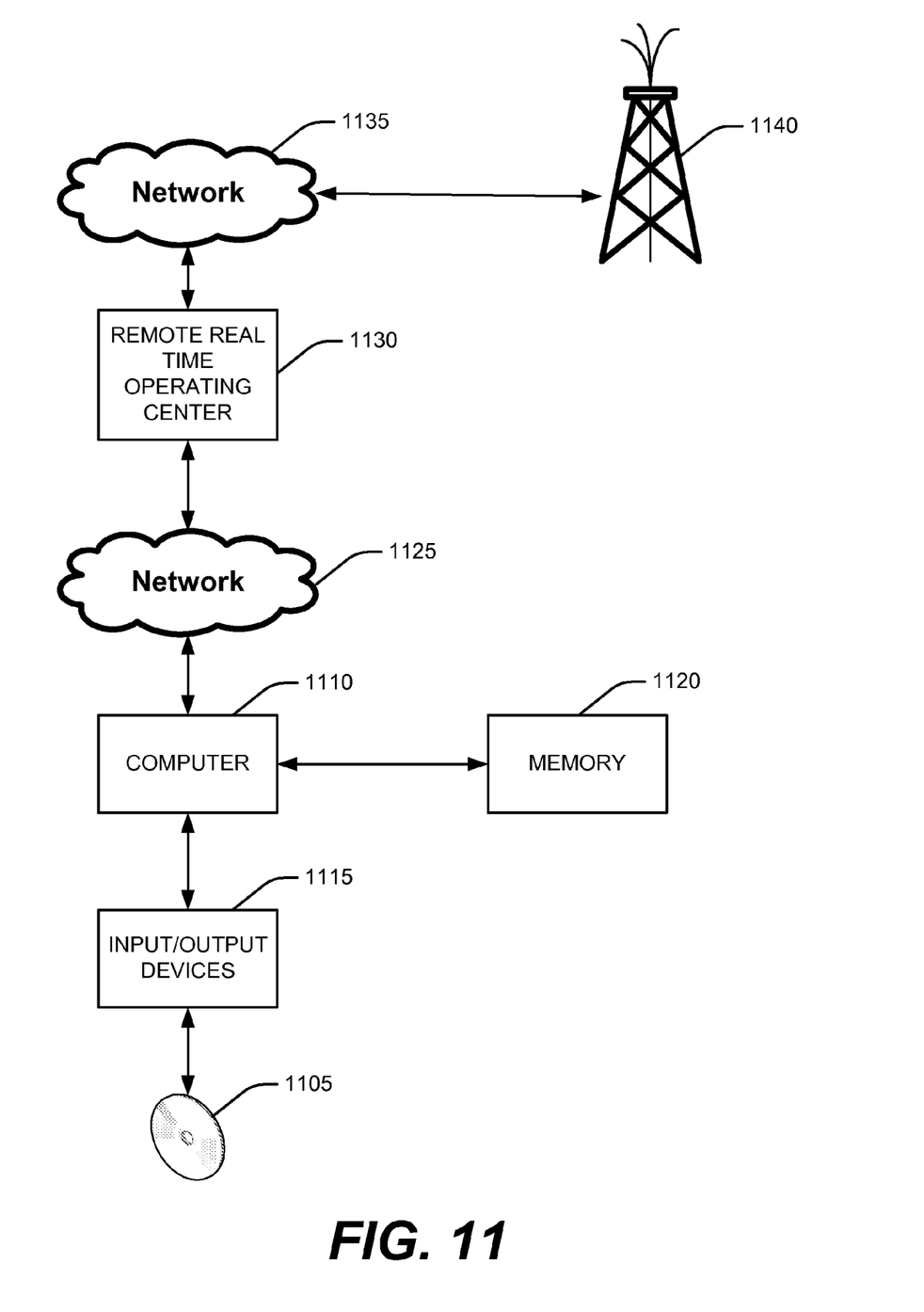
FIG. 11 shows an example environment for a restored space stratigraphic layering system.

In one embodiment, the restored space stratigraphic layering system is stored in the form of a computer program on a computer readable media 1105, such as a CD or DVD, as shown in FIG. 11. In one embodiment a computer 1110 reads the computer program from the computer readable media 1105 through an input/output device 1115 and stores it in a memory 1120 where it is prepared for execution through compiling and linking, if necessary, and then executed. In one embodiment, the system accepts inputs through an input/output device 1115, such as a keyboard, and provides outputs through an input/output device 1115, such as a monitor or printer. In one embodiment, the system creates an earth model in memory 1120 or modifies an earth model that already exists in memory 1120.

In one embodiment, the earth model that resides in memory 1120 is made available through a network 1125 to a remote real time operating center 1130. In one embodiment, the remote real time operating center makes the earth model, or data from the earth model, available through a network 1135 to help in the planning of oil wells 1140 or in the drilling of oil wells 1140.

The text above describes one or more specific embodiments of a broader invention. The invention also is carried out in a variety of alternate embodiments and thus is not limited to those described here. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

The invention claimed is:

1. A method for modeling a sequence in the earth comprising:
   a computer creating a restored space corresponding to an area-depth model of a sequence in the earth, the area-depth model of the sequence comprising:
      a substantially curved upper sequence boundary;
      a substantially curved lower sequence boundary;
      where at least one of the boundaries includes an unconformity;
   the computer creating the restored space by transforming the sequence into the restored space to produce a restored space sequence comprising:
      a restored top boundary:
         which is the upper sequence boundary transformed into the restored space;
         which has a position;
         which is substantially flat and substantially parallel to an area axis; and
      a restored base boundary:
         which is the lower sequence boundary transformed into the restored space;
         which has a position; and
         which is substantially flat and substantially parallel to the area axis; and
      a gap, which is the unconformity transformed into the restored space;
   where the restored space is pseudo-Wheeler space;
   the computer performing stratigraphic layering by adding a new boundary within the restored space sequence, using as guides the positions of the restored top boundary and the restored base boundary of the sequence in restored space, and without using any other data from the model, the new boundary not including any portion of any boundary in the restored space sequence; and the computer modeling a deposition of sediments over time in the restored space.

2. The method of claim 1 where performing stratigraphic layering comprises:
   performing a stratigraphic layering technique chosen from the group of top-down stratigraphic layering, bottom-up stratigraphic layering, and proportional layering.

3. The method of claim 1 where performing stratigraphic layering comprises:
   performing stratigraphic layering in the gap in the restored space.

4. The method of claim 1 further comprising:
   identifying facies within the restored space sequence.

5. The method of claim 1 further comprising:
   transforming the restored space sequence to area-depth space.

6. A non-transitory tangible computer readable storage medium storing a computer program for modeling a sequence in the earth, the sequence defined by an upper sequence boundary and a lower sequence boundary, where at least one of the boundaries includes an unconformity, the program comprising:
   executable instructions stored on the tangible computer readable storage medium that cause a computer to create a restored space corresponding to an area-depth model of a sequence in the earth, the area-depth model of the sequence comprising:
a substantially curved upper sequence boundary;
a substantially curved lower sequence boundary;
where at least one of the boundaries includes an unconformity;
create the restored space by transforming the sequence into the restored space to produce a restored space sequence comprising:
a restored top boundary:
which is the upper sequence boundary transformed into the restored space;
which has a position;
which is substantially flat and substantially parallel to an area axis; and
a restored base boundary:
which is the lower sequence boundary transformed into the restored space;
which has a position; and
which is substantially flat and substantially parallel to the area axis; and
a gap, which is the unconformity transformed into the restored space;
where the restored space is pseudo-Wheeler space;
executable instructions stored on the tangible computer readable storage medium that cause the computer to perform stratigraphic layering by adding a new boundary within the restored space sequence, using as guides the positions of the restored top boundary and the restored base boundary of the restored space sequence, and without using any other data from the model, the new boundary not including any portion of any boundary in the restored space sequence; and executable instructions stored on the tangible computer readable storage medium that cause the computer to model a deposition of sediments over time in the restored space.

7. The computer program of claim 6 where, when performing stratigraphic layering, the computer:
performs a stratigraphic layering technique chosen from the group of top-down stratigraphic layering, bottom-up stratigraphic layering, and proportional layering.

8. The computer program of claim 6 where, when performing stratigraphic layering, the computer:
performs stratigraphic layering in the gap in the restored space.

9. The computer program of claim 6 further comprising:
executable instructions stored on the tangible computer readable storage medium that cause the computer to identify facies within the restored space sequence.

10. The computer program of claim 6 further comprising:
executable instructions stored on the tangible computer readable storage medium that cause the computer to transform the restored space sequence to area-depth space.

11. A method for modeling a sequence in the earth comprising:
displaying by a computer an area-depth model of a sequence comprising:
a substantially curved upper sequence boundary;
a substantially curved lower sequence boundary;
where at least one of the boundaries includes an unconformity;
displaying by the computer the sequence transformed into a restored space sequence in a restored space, the restored space sequence comprising:
a restored top boundary:
which is the upper sequence boundary transformed into the restored space;
which has a position;
which is substantially flat and substantially parallel to an area axis; and
a restored base boundary:
which is the lower sequence boundary transformed into the restored space;
which has a position; and
which is substantially flat and substantially parallel to the area axis; and
a gap, which is the unconformity transformed into the restored space;
providing by the computer a display through which a selection is made among techniques for performing stratigraphic layering within the restored space sequence to produce a stratigraphically layered sequence, using as guides the positions of the restored top boundary and the restored base boundary of the sequence in restored space, and without using any other data from the model, the new boundary not including any portion of any boundary in the restored space sequence;
displaying by the computer the stratigraphically layered sequence transformed into area-depth space;
where the restored space is pseudo-Wheeler space; and
modeling by the computer a deposition of sediments over time in the restored space.

12. The method of claim 11, wherein the display for selecting among techniques for performing stratigraphic layering within the restored space sequence comprises selections for top-down stratigraphic layering, bottom-up stratigraphic layering, and proportional layering.

13. The method of claim 11, further comprising:
the computer providing a display for modeling a deposition of sediments over time in the restored space.

14. The method of claim 11, further comprising:
the computer providing a display for identifying facies within the restored space sequence.

* * * * *